March 28, 1967 C. B. DURGIN ET AL 3,311,760

HIGH Q RESONATOR

Filed Nov. 21, 1963 2 Sheets-Sheet 1

WITNESSES

Theodore F. Wrobel

James F. Young

INVENTORS
John H. Thompson, Charles B. Durgin
and Robert H. Whittaker
BY Dean Schron
ATTORNEY March 28, 1967 C. B. DURGIN ET AL 3,311,760

HIGH Q RESONATOR

Filed Nov. 21, 1963 2 Sheets-Sheet 2

United States Patent Office 3,311,760
Patented Mar. 28, 1967

3,311,760
HIGH Q RESONATOR
Charles B. Durgin and John H. Thompson, Penn Hills Township, and Robert H. Whittaker, Franklin Township, Pa., assignors to Westinghouse Electric Corporation, Pittsburgh, Pa., a corporation of Pennsylvania
Filed Nov. 21, 1963, Ser. No. 325,360
15 Claims. (Cl. 310—8)

This invention in general relates to electromechanical vibrators, and in more particular to flexural mode resonators.

Electromechanical resonators find utility in a variety of electrical circuits such as filters, temperature or physical property sensors, signaling circuits, and oscillator circuits, to name a few. One familiar type of resonator is the well known quartz crystal which for many applications is useful but, however, requires a complex process in the making thereof which greatly increases cost. In addition, the quartz crystals are brittle and susceptible to breakage unless additional shock mountings are provided. To this end, there has been proposed an electromechanical resonator in the form of a flat plate which will resonate at a so-called fundamental frequency wherein the surface of the plate is divided into four alternately stressed sectors, thus defining two mutually perpendicular nodal lines. If the resonator is driven at this fundamental frequency, an output signal may be obtained therefrom. The plates may be excited into vibration by the application of a proper electrical signal to transducer means located on one or more surfaces of the plate. A disadvantage which is encountered in the operation of the resonator is that resonance may occur at frequencies other than the desired fundamental frequency thereby necessitating the use of expensive frequency filters as a part of the circuit in which the resonator plate is utilized. When the transducer means are used to activate the plate into vibration, it has been found that a relatively low output signal is obtained.

It is therefore one object of the present invention to provide a flexural mode resonator which will provide a higher output signal at the fundamental operating frequency.

It is another object to provide a flexural mode resonator which will reduce the magnitude of certain output signals at frequencies other than the fundamental.

Another object is to provide an improved flexural mode resonator which will eliminate certain output signals at frequencies other than the fundamental.

It is a further object to provide a high Q flexural mode resonator.

Another object is to provide an extremely rugged high Q flexural mode resonator.

Another object is to provide a high Q flexural mode resonator which will eliminate the need for expensive filters in various circuit applications.

Basically, in accordance with the above objects, there is provided a flexural mode resonator member which has two substantially perpendicular nodal lines at a first mode of operation and a plurality of other nodal lines at other and higher opertaing modes, the area between the nodal lines therefore defining sector areas of the flexural mode member. Means are provided to support the flexural mode member in an advantageous manner and in order to drive the member into an oscillatory condition as well as to provide signals indicative thereof, there is provided a plurality of transducer means which are connected to the flexural mode member to provide positive and negative electrical signals when stressed in a first and second direction, and conversely, to stress the flexural mode member in a first and second direction in accordance with the polarity of electrical signals applied thereto. The contact area of the transducer means with the member is relatively larger than heretofore in order to produce a higher signal at the fundamental frequency. The transducer means are positioned on the flexural mode member so as not to cross the nodal lines at the first mode of operation, and to cross certain nodal lines at the higher modes of operation. In this manner, each transducer means is completely within a sector at the first mode of operation and is in a plurality of sectors at the higher modes of operation.

The above stated and further objects of the present invention will become more fully apparent upon the reading of the following detailed specification taken in conjunction with the drawings, in which.

Figure 1:
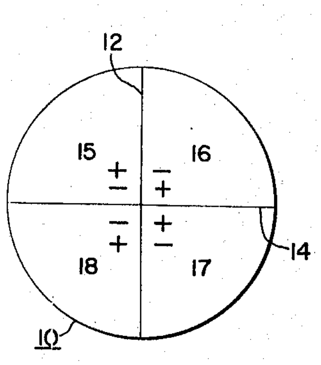
Fig.1. PRIOR ART
FIG. 1 is a plan view of a flexural mode disk resonator.

Referring now to FIG. 1, there is illustrated one form of flexural mode resonator in the form of a disk 10. By virtue of the fact that disks may be easily machined on a lathe to desired diameters, and may be cut to desired thicknesses from bar stock, the present invention will be described with respect to flexural mode disks, however it is to be understood that the principles of the present invention pertain to flexural mode members of other shapes. When set into vibration at a first mode of operation, which will be considered as the fundamental operating frequency, the disk 10 includes a first nodal diameter 12 and a second nodal diameter 14 which divide the disk 10 into four equal sector areas labeled 15, 16, 17 and 18. In the first operating mode, the two sectors 15 and 17 simultaneously project upward, that is toward the viewer, and the two sectors 16 and 18 simultaneously project downward away from the viewer. On a different half cycle, the two sectors 15 and 17 will project downward and the two sectors 16 and 18 will project upward. One manner in which energy may be imparted to the flexural mode disk may be by transducer means and to this end reference is now made to FIG. 2.

Figure 2:
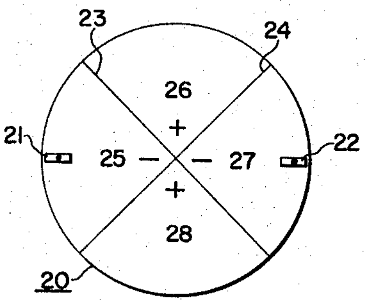
FIG. 2 is a plan view of a prior art flexural mode disk resonator driven by transducer means.

In FIG. 2, there is shown a flexural mode disk 20 of the prior art, having a relatively small transducer driving means 21 which is operable to set the disk 20 into vibration at its fundamental frequency, with the nodal diameters 23 and 24 being determined by the positioning of the transducer means 21. As a general rule, in a pure disk free from flaws, the positioning of the transducer means will determine the location of the nodal diameters. In some instances, when a perfect disk is not obtainable, the nodal diameters are defined, and may be found by null detecting methods, and the transducer driving means thereafter placed accordingly. A relatively small transducer pickup means 22 is positioned on the disk surface and will provide an output signal indicative of the vibratory condition of the disk 20. In a manner similar to FIG. 1, the disk 20 is divided into four sectors 25, 26, 27 and 28 each of which is alternately stressed on opposite half cycles of operation.

Basically, the resonant frequency at the fundamental operating mode is dependent upon the motional compliance or inverse spring stiffness of the disk. That is, the resonant frequency is principally determined from the disk dimensions, Young's modulus of elasticity, and the material, or mass density of the disk.

Due to the mechanical nature of the disk, relative to stress, strain, torsional, and energy storage considerations, to name a few, there exist certain frequencies at which the maximum kinetic energy storage during a cycle is equal to the maximum potential energy storage during the cycle. These frequencies, other than the fundamental, are herein referred to as the overtones. The operation of the disk resonator may be represented by a mathematical boundary value problem having a plurality of partial differential equations, the solution to each representing a particular overtone frequency of vibration. For many applications of the disk resonator, these overtone frequencies are unwanted and may interfere with proper operation. At the higher operating mode, the positioning of the nodal diameters assumes a different configuration; to this end reference is now made to FIG. 3.

Figure 3:
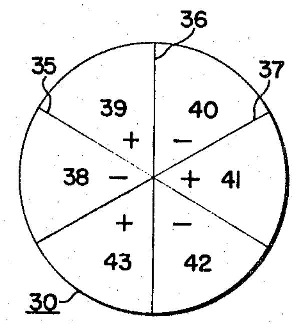
FIG. 3 illustrates one configuration of nodal diameters occurring at a frequency of operation other than the fundamental.

In FIG. 3, there is shown a disk member 30 having a plurality of nodal diameters 35, 36 and 37 defining a plurality of sectors 38 to 43, with the sectors stressed at any one instant of time in a direction as indicated by the positive and negative symbols in each sector. The configuration shown in FIG. 3 represents nodal diameters occurring at a higher mode of operation generally termed an overtone, and is representative of only one such configuration possible. Other overtones produce a greater plurality of nodal diameters. In some cases nodal circles, and combinations of nodal circles and diameters, are possible. The nodal configurations produced at the higher operating modes are numerous, and some cannot even be determined. A nodal diameter, or a nodal circle, or any various combinations thereof will hereinafter be termed, generically, nodal lines.

Figure 4:
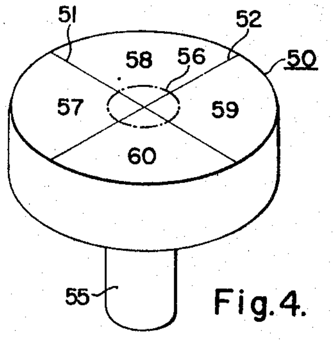
FIG. 4 illustrates a preferred form of support for the resonator member.
Figure 5:
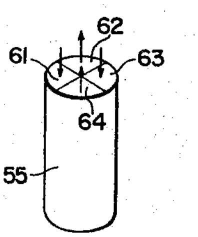
FIG. 5 illustrates a perspective view of the support means of the resonator of FIG. 4.

In order to maintain a high Q, the vibratory forces produced by the disk must not load down the disk nor be lost through supporting means. In FIG. 4, there is shown a preferred means of supporting a disk 50 in accordance with these objects. Assume that disk 50 is in a vibratory condition and includes nodal diameters 51 and 52. Support post 55 is made integral with the disk 50 at the intersection of the two nodal diameters 51 and 52 as shown by the projection 56 of the post 55 upon the top surface of the disk 50. In FIG. 5, there is shown a portion of the support post 55 with the top surface representing any plane through the post. As shown in FIG. 5, at one instant of time, there are two equal forces projecting downwardly on the two quadrants 61 and 63. Since the support post 55 is integral with the disk 50, this projection force is due to the downward deflection of the two sectors 57 and 59 (FIG. 4). At the same instant of time, the two quadrants 62 and 64 have two equal forces projecting in an upward direction due to the upward flexing of the two sectors 58 and 60 of the disk 50. Thus at any one instant of time, the resultant force on the post 55 is substantially zero and no vibratory losses are transmitted through the post, an important consideration in maintaining a high Q resonator. On opposite half cycles, the forces shown in FIG. 5 are reversed. In order to properly drive and pick off signals from the disk in accordance with the invention, transducer means are provided and to this end reference should now be made to FIG. 6.

Figure 6:
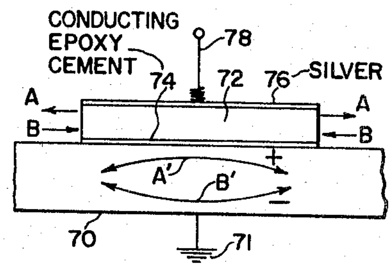
FIG. 6 illustrates piezoelectric transducer means in accordance with a preferred embodiment of the present invention.

In FIG. 6, there is shown a portion of a disk 70 which is electrically conductive and grounded at 71. Operatively connected to the disk 70 is a piezoelectric transducer means comprising the piezoelectric element 72 bonded to the disk 70 by means of an electrically conducting epoxy cement 74. Although not limited thereto, the piezoelectric element 72 is preferably of a piezoceramic form such as PZT (lead-zirconate-titanate). In order to make electrical contact with the piezoceramic element 72, there is provided an electrically conducting layer 76 such as silver, on the top surface thereof and to which is attached a terminal 78 for receiving or providing an electrical signal. The piezoceramic element 72 is of a polarized nature; that is if a positive electrical signal is applied to terminal 78 an electric field is set up such that the portion of piezoceramic element 72 located beneath the electrically conducting layer 76 (in FIG. 6, the whole element) will be stressed in a first direction, for example outwardly, as indicated by the arrows labeled A. When a negative electrical signal is applied to terminal 78, the piezoceramic element beneath the conducting layer 76 will be stressed in a second direction, that is inwardly as indicated by the arrows labeled B. Since the piezoceramic element 72 is bonded to the disk member 70, a positive electrical signal will cause the disk to bend or bow in a direction substantially as indicated by the arrow A′, and when stressed inwardly the disk 70 will bow in a direction substantially as indicated by the arrow B′. This operation demonstrates how the disk is set into a vibratory condition by the application of electrical signals to the terminal of the transducer means shown in FIG. 6. Conversely, if the disk 70 is bowed in a direction as indicated by the arrow A′, the piezoceramic element 72 will be stressed outwardly and a positive signal will appear at the terminal 78, and when the disk 70 is bowed in a direction indicated by the arrow B′ the piezoceramic element 72 will be stressed inwardly to produce a negative signal at the terminal 78. The signal thus appearing at terminal 78 is indicative of the magnitude and direction of the stressing of the disk 70 and substantially defines the signal pickup operation. In order to obtain higher outputs at a fundamental operating frequency, in addition to reducing, if not substantially eliminating, outputs at higher operating frequencies, the transducer element of FIG. 6 must be properly positioned on a disk member and to this end reference is made to FIG. 7.

Figure 7:
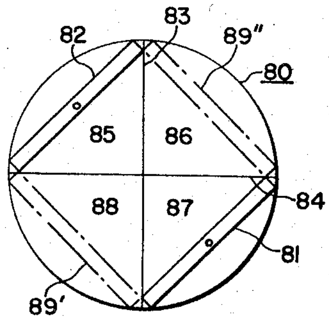
FIG. 7 illustrates the placement of transducer means on a flexural mode disk resonator in accordance with one embodiment of the present invention.

In FIG. 7, there is shown one embodiment of the present invention and includes a disk member 80 having a transducer driving means 81 and a transducer pickup means 82 chordally arranged on one of the disk's surfaces. The nodal diameters at the fundamental operating frequency are designated as 83 and 84 which define four sectors 85, 86, 87 and 88. At the fundamental operating frequency, it is seen that the drive means 81 and the pickup means 82 are located completely within individual sectors 87 and 85 respectively. In order to impart a greater energy into the disk, the chordal drive element 81 extends from the vicinity of the intersection of one nodal diameter and the edge of the disk 80 to the intersection of the other nodal diameter with the edge of the disk 80. Pickup element 82 is likewise positioned. If the chordal elements 81 and 82 are diminished in size and moved closer toward the intersection of the two nodal diameters 83 and 84, a resonator having a higher Q will result; however, the output signal will be somewhat diminished. To obtain a greater output signal, in addition to imparting greater energy to the disk 80 additional transducer means may be chordally placed on the disk 80 as shown by the dotted elements 89′ and 89″.

Figure 8:
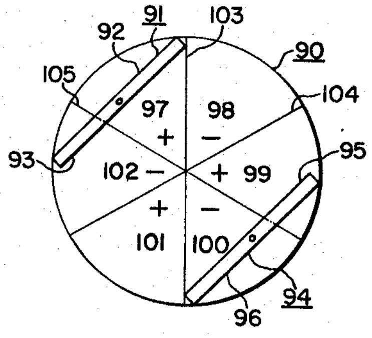
FIG. 8 illustrates the resonator of FIG. 7 operating at a higher frequency mode.

In FIG. 8 there is shown a disk 90 which is operating at an undesired higher overtone frequency which produces three nodal diameters 103, 104 and 105, similar to FIG. 3, dividing the disk 90 into a plurality of sectors 97, 98, 99, 100, 101 and 102 each of which is oppositely stressed from its adjacent sector as denoted by the positive and negative symbols. The transducer means is similar to that of FIG. 7 in that there is provided a chordal driving element 94 and a chordal pickup element 91. By examining the pickup element 91 it is seen that the nodal diameter 105 crosses beneath the element, separating it into two sections 92 and 93. Section 92 is bonded to sector 97 which is being stressed in one direction and section 93 is bonded to sector 102 which is stressed in the opposite direction. It is therefore seen that section 93 provides an output signal of a first polarity as was explained with respect to FIG. 6 and section 92 produces an output signal of an opposite polarity, tending to cancel the first named signal such that the resultant output signal is of a reduced magnitude. At other operating frequencies, a nodal diameter bisecting the pickup element 91 will cause a complete cancellation and therefore the output signal at this unwanted overtone will be zero. Other types of nodal line configurations, too numerous to mention, will similarly cancel or substantially reduce any output signal at the higher overtone frequencies.

Figure 9:
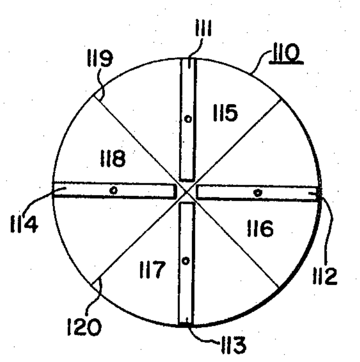
FIG. 9 illustrates another embodiment of the present invention.

Another embodiment of the present invention is shown in FIG. 9 and includes a disk 110 having a plurality of transducer drive and pickup elements associated therewith especially well adapted to eliminate or reduce output signals at operating modes which produce nodal circles. Four piezoceramic transducers are shown, namely transducers 111, 112, 113 and 114 and depending upon the chosen polarity, one or more may be utilized to drive the disk and the remaining utilized to pick up any signal indicative of the vibratory condition of the disk. By way of example, if transducer means 111 and 113 are utilized as the driving elements, transducer means 112 and 114 may be utilized as the pickup elements with each element located in an individual sector 115 to 118, at the fundamental operating frequency having nodal diameters 119 and 120. At operating frequencies, other than the fundamental, the pickup elements 112 and 114 will cross a nodal line thereby being placed in more than one sector and a reduction or cancellation of an output signal will occur at the particular operating frequency, as was demonstrated with respect of FIG. 8. The radial transducer elements 111 to 114 shown in FIG. 9 extend from substantially the edge of the disk to substantially the intersection of the two nodal diameters 119 and 120. These lengths provide for a greater coupling of energy into and out of the disk but it is apparent that a somewhat shorter radial element may be utilized. Better results are obtainable, however, when the radial element is at least equal to one-half of the radius of the disk. Although four radial elements are shown in FIG. 9 fewer, or more, could be utilized, following the principal teachings of the invention of positioning the transducer elements completely within a sector at the fundamental operating frequency and to cross certain nodal lines at the higher operating frequencies.

Figure 10:
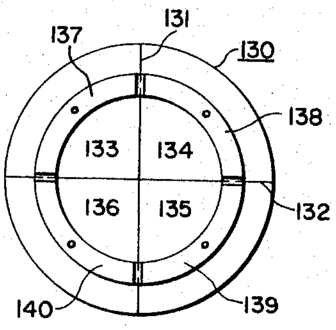
FIG. 10 illustrates still another embodiment of the present invention.

Another embodiment of the present invention is shown in FIG. 10. The disk 130 operating at its fundamental frequency includes nodal diameters 131 and 132 dividing the disk 130 into four sectors 133, 134, 135 and 136. Arcuately arranged in these sectors are transducer means 137, 138, 139 and 140 respectively, the resulting structure being particularly well adapted for signal reduction or cancellation at higher overtones which produce a plurality of nodal diameters. Any one or more of the arcuate transducer means may be utilized as the driving element or elements, and the remaining utilized as the pickup element or elements. In order to maintain facility in manufacture, the transducer means 137 to 140 may be fabricated by slicing a piezoceramic tube or the like, resulting in an annular or ring-shaped piezoceramic element onto which electrically conducting layers may be deposited to form an arcuate transducer means of a desired length. In FIG. 10, each arcuate transducer means extends to substantially the nodal diameters 131 and 132.

Figure 11:
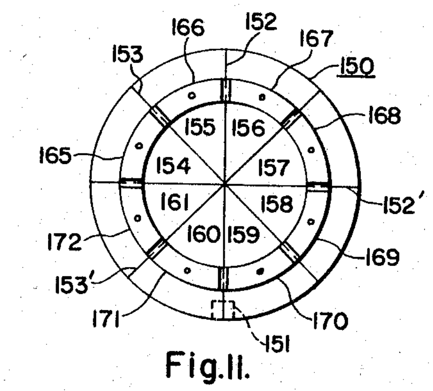
FIG. 11 illustrates still another embodiment of the present invention.

It has been found that if a dissymmetry portion is provided, a flexural mode disk resonator may operate at either of two fundamental frequencies. In FIG. 11, there is shown a disk 150 having a dissymmetry portion such as a hole 151 drilled into the side surface. This results in a disk having nodal diameters 152 and 152' at one fundamental frequency and nodal diameters 153 and 153' at a second fundamental frequency. An annular piezoceramic element similar to that shown in FIG. 10 may be placed on the surface of the disk 150 with conducting layers applied thereto for providing a plurality of transducer elements 165 to 172 each located respectively in sectors 154 to 161. By utilizing transducer elements 165 and 166 in combination with transducer elements 169 and 170 as driving elements, an output signal may be derived from the remaining transducer elements 167 and 168 in combination with 171 and 172. The disk will then operate at a first fundamental frequency having the nodal diameters 152 and 152'. In order to operate at the other fundamental frequencies having the nodal diameters 153 and 153', transducer elements 168 and 169 in combination with transducers 165 and 172 may be utilized as the driving elements and the remaining transducer elements 166 and 167 in combination with 170 and 171 may be utilized for signal output purposes.

Figure 12:
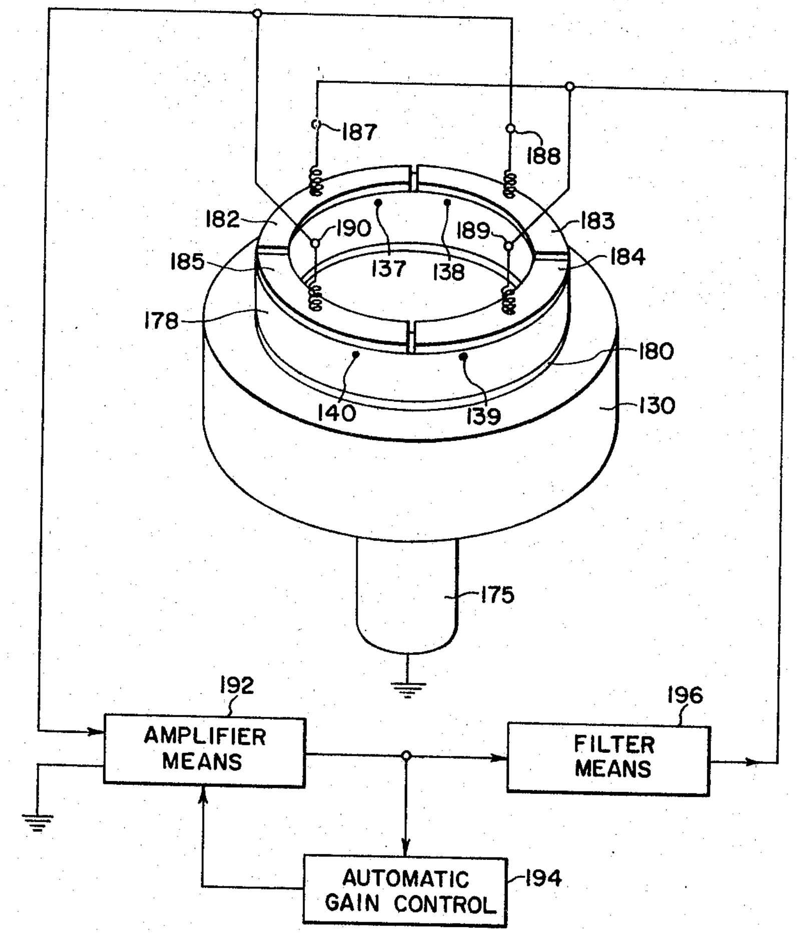

As was stated, the flexural mode disk finds great utility in many applications such as filter elements, temperature sensors one such sensor being more fully described and claimed in a copending application by John H. Thompson et al., Ser. No. 295,393 filed July 16, 1963, signaling circuits and oscillators, to name a few. FIG. 12 illustrates, partially in block diagram form, the utilization of a flexural mode disk resonator in an oscillator circuit. The resonator shown in perspective is the one demonstrated with respect to FIG. 10. Integral with the disk member 130 is support post 175 which is electrically grounded. The piezoceramic annular ring 178 is bonded to the disk 130 by means of conducting epoxy 180 as described heretofore. Conducting layers 182 to 185 are deposited on the top surface of the piezoceramic ring 178 to form the transducer means 137 to 140 respectively. Terminals 187 and 189 are electrically connected together so that transducer means 137 and 139 act as driving elements and in a similar manner terminals 188 and 190 are electrically connected together such that the transducer means 138 and 140 act as pickup elements. The oscillator includes amplifier means 192 which is operatively connected to the output transducers 138 and 140. In order to provide proper gain stabilization, there is included in the circuit, an automatic gain control 194 as is well known to one skilled in the art. In order to insure that only frequencies below a predetermined cutoff point are passed from the output of the amplifier means 192, there is provided filter means 196 the output of which is fed to the driving transducers 137 and 139. Heretofore, the filter means required a complexity of precision components to insure proper operation. The provision of a flexural mode resonator, in accordance with the present invention, providing a stronger output signal at the desired fundamental frequency eliminates the need for expensive complex filters.

Since the resonator of the present invention functions in a manner to reduce or substantially eliminate many higher overtone frequencies of operation, the disk may be utilized as a relatively inexpensive and simple filter means in various filter circuits wherein a plurality of different frequencies may be inputed but only the desired fundamental frequency passed.

Accordingly, there has been provided a high Q flexural mode resonator which will operate in a first mode of operation herein termed the fundamental frequency to give a higher output signal than heretofore, in addition to substantially reduce or eliminate output signals at undesired higher modes of operation herein termed overtones.

Although the present invention has been described with a certain degree of particularity, it should be understood that the present disclosure has been made by way of example and that modifications and variations of the present invention are made possible in the light of the above teachings.

We claim as our invention:

1. A high Q resonator comprising:
a flexural mode member having two perpendicular nodal lines at a first mode of operation and a plurality of other nodal lines at higher modes of operation;
driving means for said member responsive to an input signal to place said member into a vibratory condition;
pickup means for said member responsive to said vibratory condition for providing an output signal indicative thereof;
said driving and pickup means constructed and arranged relative to said member so as not to cross a nodal line of said first mode of operation and to cross certain nodal lines at said higher modes of operation.

2. A high Q resonator comprising:
a flexural mode disk member having two nodal diameters at a first mode of operation and a plurality of nodal lines at higher modes of operation;
driving means associated with said disk and responsive to a drive signal for stressing said disk to place it into vibration;
pickup means responsive to said vibration for providing an output signal indicative thereof;
said driving and pickup means constructed and arranged on said disk so as not to cross said nodal diameters at said first mode of operation and to cross certain nodal lines at said higher modes of operation.

3. An electromechanical resonator comprising:
a flexural mode member;
said member having two substantially perpendicular nodal lines at a first mode of operation and a plurality of other nodal lines at other opearting modes, the area between said nodal lines defining a sector;
a plurality of piezoelectric transducer means operable to provide positive and negative electrical signals when stressed in a first and second direction respectively and operable to be stressed in a first and second direction in accordance with the polarity of an electrical signal applied thereto;
each said transducer means being in electrical contact with said member and positioned to be completely within a sector at said first mode of operation and to be in a plurality of sectors at said higher operating modes.

4. An electromechanical vibrator comprising:
a flexural mode disk having two substantially perpendicular nodal diameters defining four sector areas when operating in a first mode of operation;
means for supporting said disk integral with said disk at the intersection of said nodal diameters;
a piezoelectric drive element chordally arranged in one of said sector areas; and
a piezoelectric pickup element chordally arranged in another of said sector areas.

5. A vibrator as in claim 4 wherein the drive element extends from substantially the intersection of one nodal diameter and the disk edge to substantially the intersection of the other nodal diameter and the disk edge.

6. A vibrator as in claim 4 wherein the pickup element extends from substantially the intersection of one nodal diameter and the disk edge to substantially the intersection of the other nodal diameter and the disk edge.

7. An electromechanical vibrator comprising: a flexural mode disk having two substantially perpendicular nodal diameters defining four sector areas in a first mode of operation support means integral with said disk at the intersection of said nodal diameters;
a first piezoelectric drive element chordally arranged in one of said sector areas;
a second piezoelectric drive element chordally arranged in another of said sector areas; and
first and second piezoelectric pickup elements chordally arranged in the remaining two sector areas respectively.

8. A high Q resonator comprising:
a flexural mode disk member having a first and second nodal diameter in a first mode of operation;
a plurality of piezoelectric transducers;
each said transducer operatively connected with a surface of said disk and positioned substantially equally distant between said nodal diameters and extending from substantially the edge of said disk to substantially the intersection of said nodal diameters.

9. A high Q resonator comprising:
a flexural mode disk member having a first and second nodal diameter in a first mode of operation;
a support post integral with said disk member at the intersection of said nodal diameters;
a plurality of piezoelectric transducers;
each said transducer operatively connected with a surface of said disk and positioned radially on said disk for a distance equal to at least one half the radius of said disk.

10. A high Q resonator comprising:
a flexural mode disk having two substantially perpendicular nodal diameters defining four sector areas in a first mode of operation;
a piezoelectric transducer drive element bonded to said disk and arcuately arranged in one of said sector areas; and
a piezoelectric transducer pickup element bonded to said disk and arcuately arranged in another of said sector areas.

11. A vibrator as in claim 10 wherein the drive element extends from substantially one of said nodal diameters to substantially the other of said nodal diameters.

12. A vibrator as in claim 10 wherein the pickup element extends from substantially one of said nodal diameters to substantially the other of said nodal diameters.

13. A high Q resonator comprising:
an electrically conducting flexural mode disk member;
means for supporting said disk member;
an annular piezoelectric member having top and bottom surfaces with said bottom surface being bonded to said disk member and in electrical contact therewith; and
a plurality of adjacent electrically conducting layers on said top surface of said annular piezoelectric member.

14. A high Q resonator comprising:
a flexural mode disk member having a dissymmetry portion whereby two fundamental operating frequencies are obtainable, one having first and second perpendicular nodal diameters and the other having third and four perpendicular nodal diameters displaced 45° therefrom;
transducer means located between said first and second nodal diameters for operating said disk member at one of said fundamental frequencies; and
transducer means located between said third and fourth nodal diameters for opearting said disk member at the other of said fundamental frequencies.

15. A high Q resonator comprising:
a flexural mode disk member having a dissymmetry portion whereby two fundamental operating frequencies are obtainable, one having first and second perpendicular nodal diameters and the other having third and fourth perpendicular nodal diameters displaced therefrom, thereby defining eight sector areas;

an annular piezoceramic transducer means bonded to a surface of said disk member; and a plurality of electrically conducting layers disposed on the surface of said piezoceramic to form a transducer means in each said sector area whereby selective energization of said transducer means will provide operation at either one of said two fundamental operating frequencies.

References Cited by the Examiner

UNITED STATES PATENTS

| | | | |
|---|---|---|---|
| 2,860,265 | 11/1958 | Mason | 333—72 |
| 2,943,278 | 6/1960 | Mattiat | 310—8.1 X |
| 3,074,034 | 1/1960 | Crownover | 310—8.1 X |
| 3,042,904 | 7/1962 | Brennemann | 333—72 |

MILTON O. HIRSHFIELD, *Primary Examiner.*

J. D. MILLER, *Assistant Examiner.*